US012811888B2

(12) United States Patent
Cariou et al.

(10) Patent No.: US 12,811,888 B2
(45) Date of Patent: Nov. 24, 2026

(54) SCS ID MAPPINGS TO MLD LINKS

(71) Applicant: Intel Products IP LLC, Santa Clara, CA (US)

(72) Inventors: Laurent Cariou, Milizac (FR); Thomas J. Kenney, Portland, OR (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 17/953,074

(22) Filed: Sep. 26, 2022

(65) Prior Publication Data

US 2023/0308396 A1 Sep. 28, 2023

(51) Int. Cl.

*H04L 47/2441* (2022.01)
*H04W 28/02* (2009.01)
*H04W 84/12* (2009.01)

(52) U.S. Cl.

CPC ..... *H04L 47/2441* (2013.01); *H04W 28/0268* (2013.01); *H04W 84/12* (2013.01)

(58) Field of Classification Search

CPC .......... H04L 47/2441; H04W 28/0268; H04W 84/12

See application file for complete search history.

(56) References Cited

FOREIGN PATENT DOCUMENTS

GB 2607650 A * 12/2022 .............. H04W 8/04

* cited by examiner

*Primary Examiner* — Mohammad S Anwar

(74) *Attorney, Agent, or Firm* — Schwegman Lundberg & Woessner, P.A.

(57) ABSTRACT

Methods, apparatuses, and computer readable media for stream classification service (SCS) identification to multi-link device (MLD) link in wireless local area network (WLAN) are disclosed. Apparatuses of a non-access point (AP) or station (STA) of a MLD are disclosed, where the apparatuses comprise processing circuitry configured to: encode for transmission, to a second MLD, a stream classification service (SCS) request frame, the SCS comprising a quality of service (QoS) element, the QoS element comprising a link identification (LinkID) subfield indicating a LinkID, where the SCS request frame comprises a SCS identification (ID)(SCSID) subfield, the SCSID subfield indicating a SCSID to be mapped to the LinkID and further configured to decode, from the second MLD, a SCS response frame to the SCS request frame, the SCS request frame indicating whether the LinkID is mapped to the SCSID.

20 Claims, 12 Drawing Sheets

SCS ID MAPPINGS TO MLD LINKS

TECHNICAL FIELD

Embodiments relate to mapping traffic with stream classification service (SCS) identifications (IDs) to links having linkIDs of a multi-link device (MLD) in accordance with wireless local area networks (WLANs) and Wi-Fi networks including networks operating in accordance with different versions or generations of the IEEE 802.11 family of standards. Some embodiments relate to mapping traffic having both a traffic identifications (TIDs) and a SCSIDs to links of MLDs.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
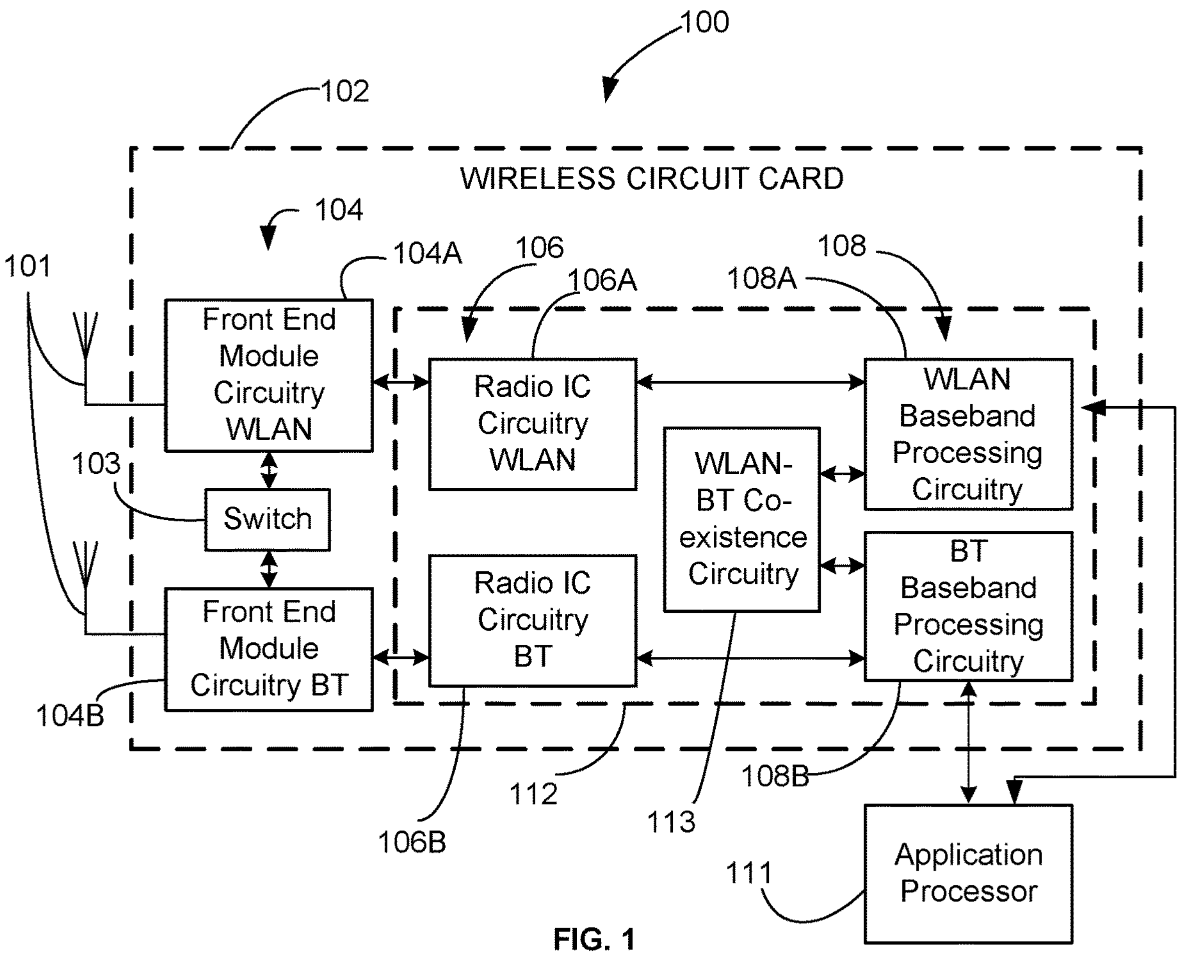
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
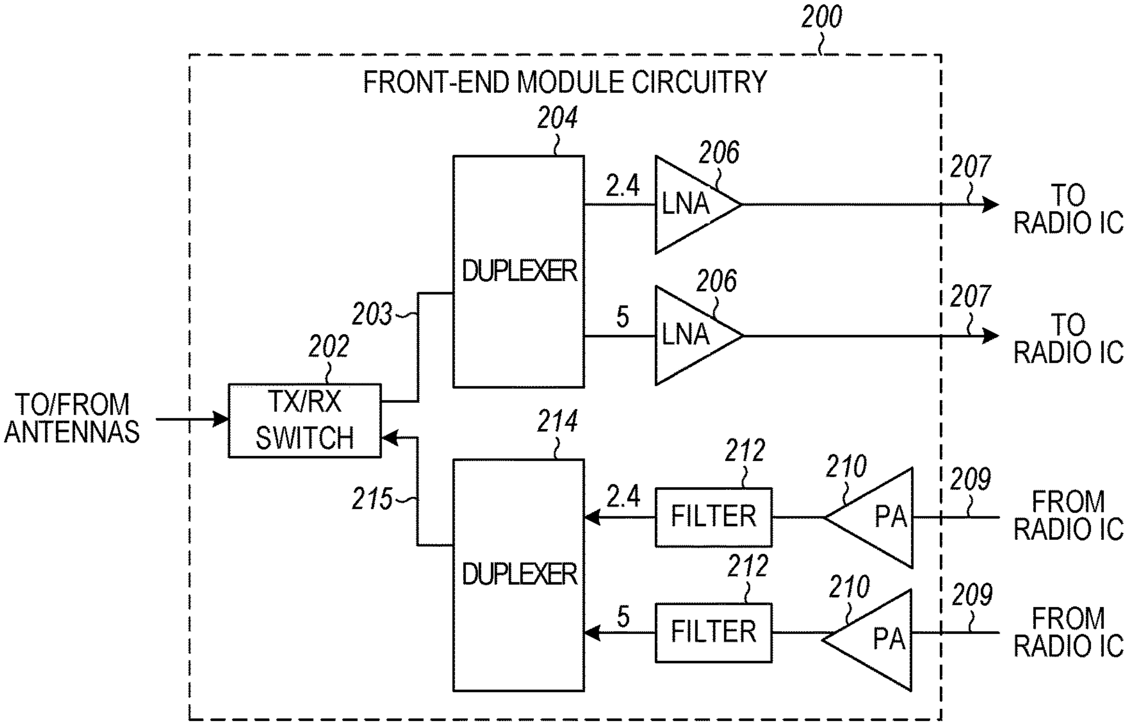
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
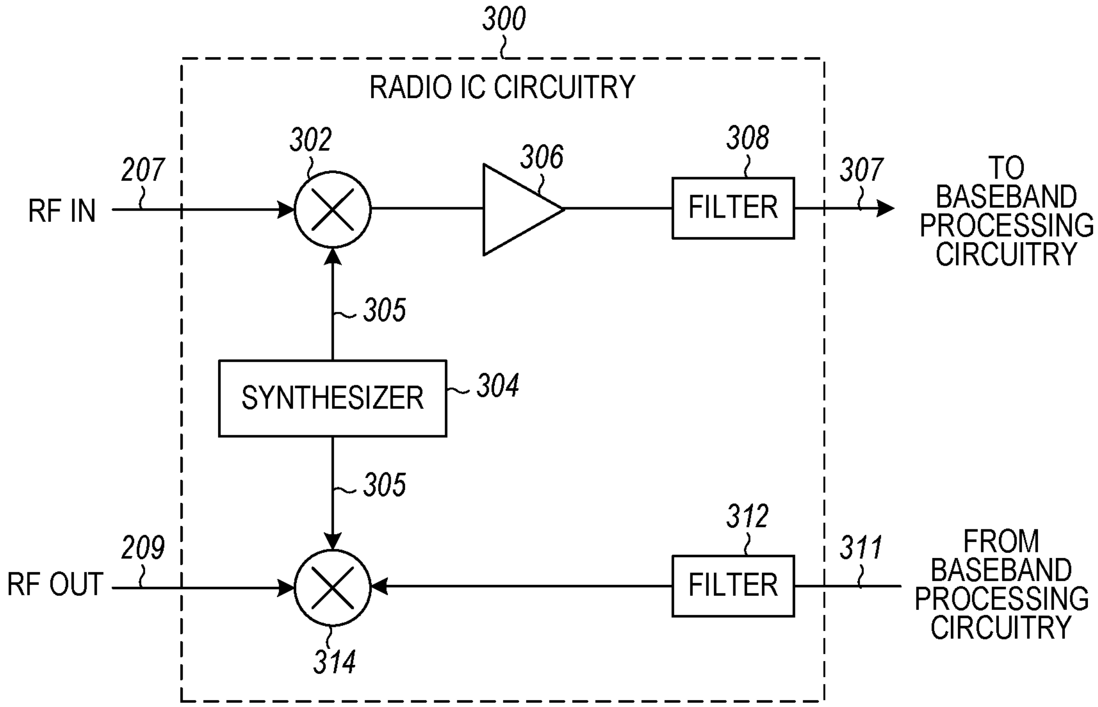
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{Lo}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{Lo}$).

Figure 4:
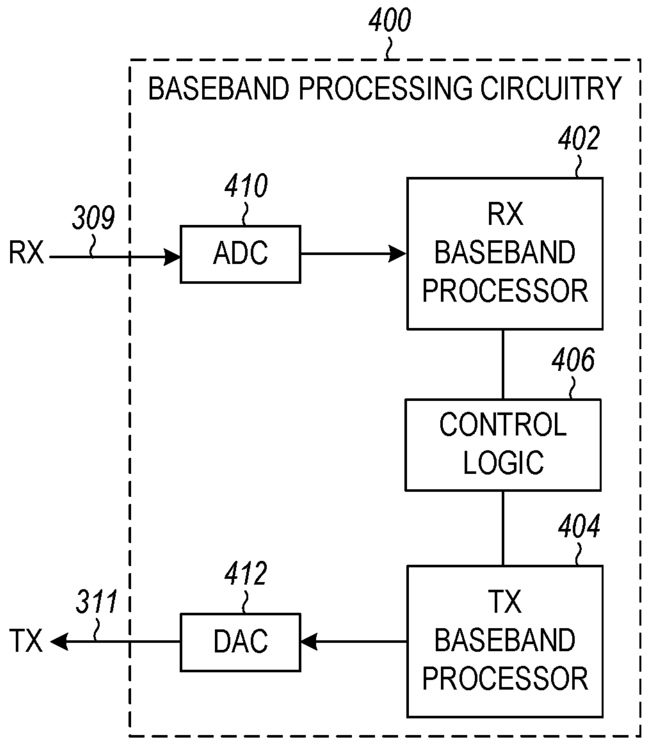
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
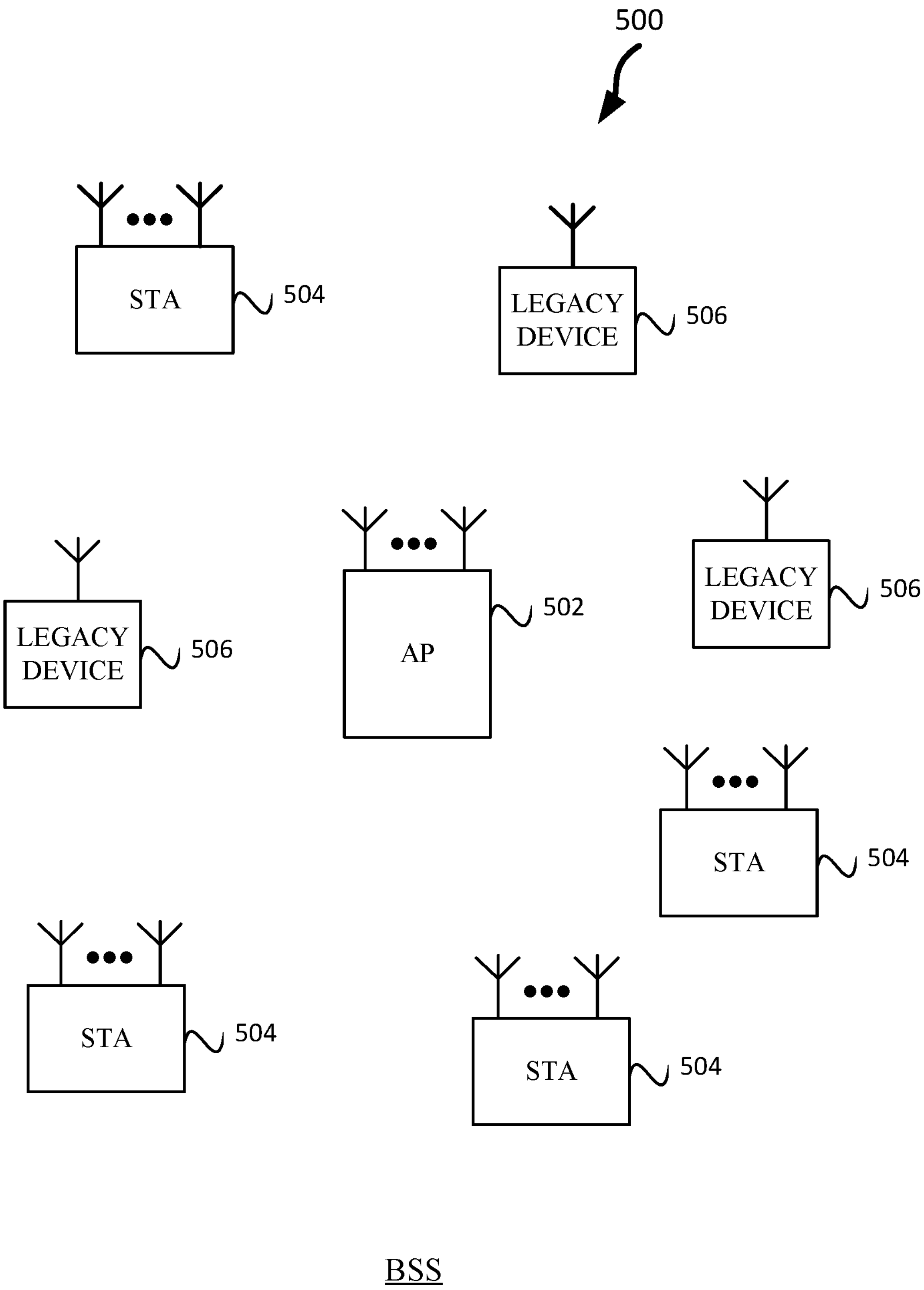
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax/bf/az. In some embodiments, IEEE 802.11EHT may be termed Next Generation 802.11. The STA 504 and AP 502 (or apparatuses of) may be configured to operate in accordance with IEEE P802.11-REVme™/D0.4, October 2021, September 2021, IEEE P802.11ax™/D8.0, IEEE P802.11-REVme™/D0.4, October 2021, and/or IEEE P802.11bf™/D0.2, July 2022, which are incorporated herein by reference in their entirety. The AP 502 and/or STA 504 may operate in accordance with different versions of the communication standards.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), OFDM, and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax/be/bf, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11be or another wireless protocol.

The AP 502 may communicate with legacy devices 506 in accordance with legacy IEEE 802.11 communication techniques. In example embodiments, the AP 502 may also be configured to communicate with STAs 504 in accordance with legacy IEEE 802.11 communication techniques.

In some embodiments, a HE, BF, or EHT frames may be configurable to have the same bandwidth as a channel. The HE or EHT frame may be a physical Layer (PHY) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE, BF, or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax/bf embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE/BF trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE, BF, or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 502 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the HE station 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-14.

In example embodiments, the STAs 504 and/or the HE AP 502 are configured to perform the methods and operations/functions described herein in conjunction with FIGS. 1-14. In example embodiments, an apparatus of the STA 504 and/or an apparatus of the AP 502 are configured to perform the methods and functions described herein in conjunction with FIGS. 1-14. The term Wi-Fi may refer to one or more of the IEEE 802.11 communication standards. AP and STA may refer to EHT/HE/BF access point and/or EHT/HE/BF station as well as legacy devices 506.

In some embodiments, a HE AP STA may refer to an AP 502 and/or STAs 504 that are operating as EHT/Bf APs 502. In some embodiments, when a STA 504 is not operating as an AP, it may be referred to as a non-AP STA or non-AP. In some embodiments, STA 504 may be referred to as either an AP STA or a non-AP. The AP 502, STAs 504, and legacy devices 506 may operates as MLD devices such as those described in conjunction with FIG. 8.

Figure 6:
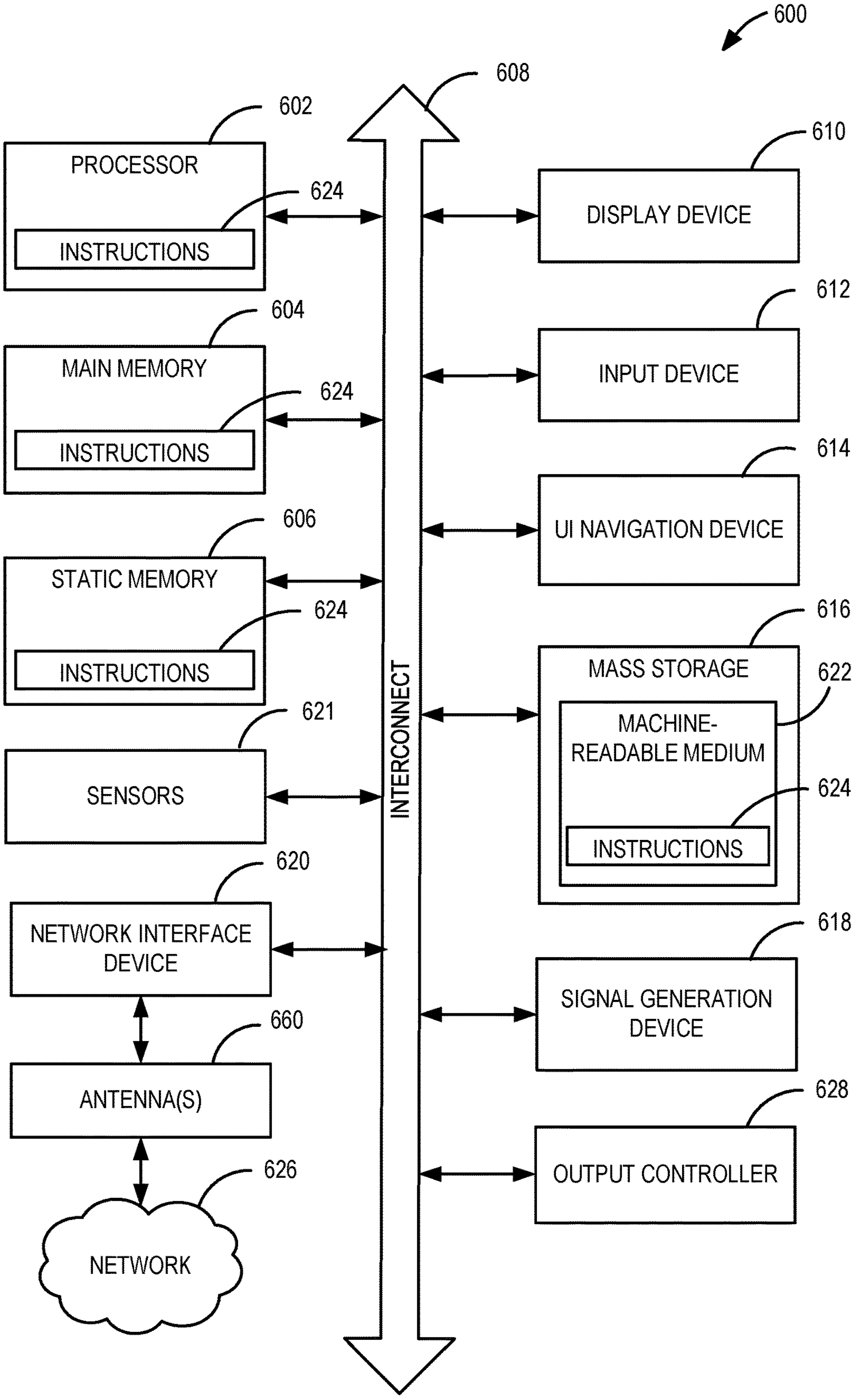
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
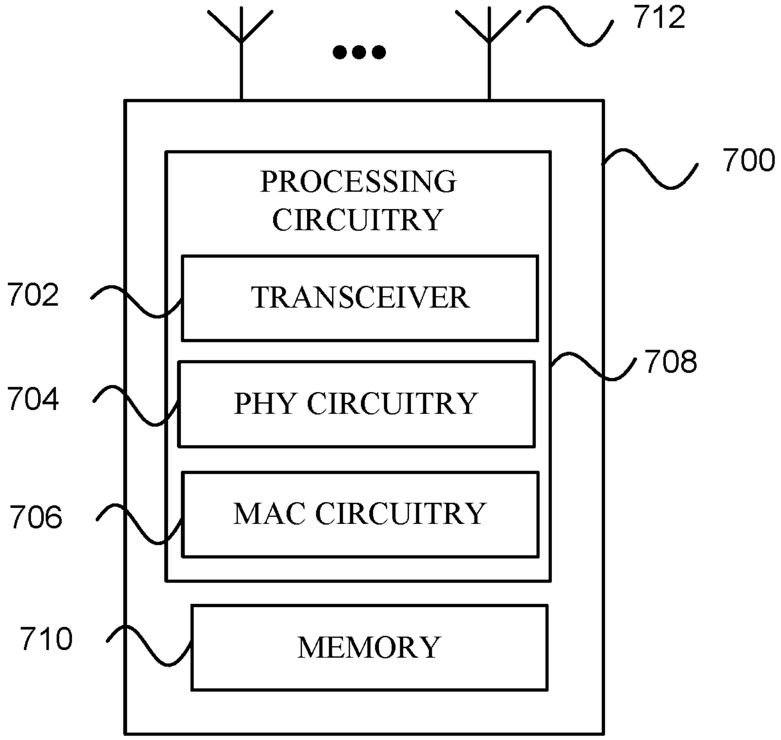
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
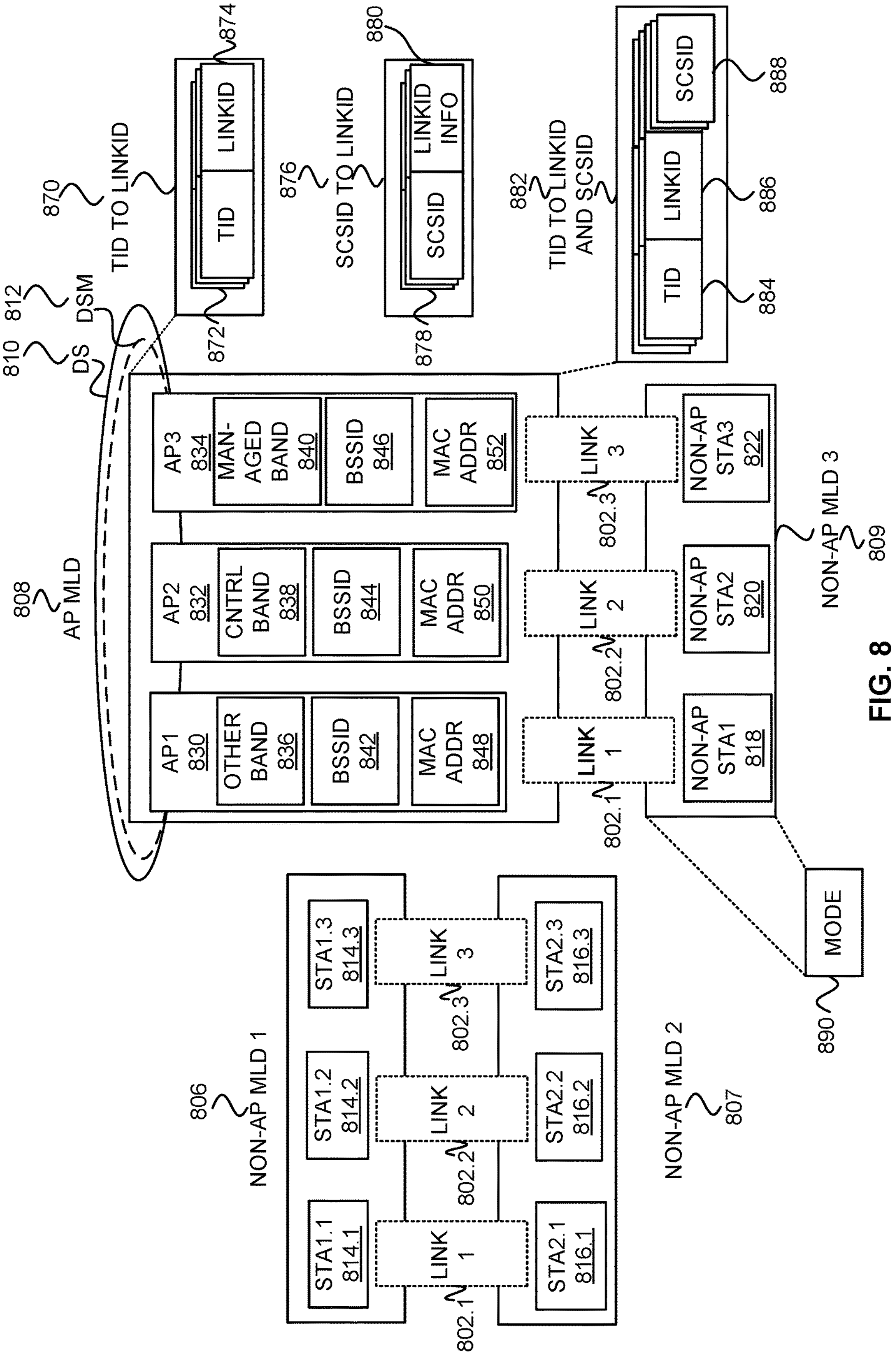
FIG. 8 illustrates multi-link devices (MLDs), in accordance with some embodiments.

FIG. 8 illustrates multi-link devices (MLDs), in accordance with some embodiments. Illustrated in FIG. 8 is ML logical entity 1 or non-AP MLD 1 806, ML logical entity 2 or non-AP MLD 2 807, ML AP logical entity or AP MLD 808, and ML non-AP logical entity or non-AP MLD 3 809. The non-AP MLD 1 806 includes three STAs, STA1.1 814.1, STA1.2 814.2, and STA1.3 814.3 that operate in accordance with link 1 802.1, link 2 802.2, and link 3 802.3, respectively. The Links are described below. Non-AP MLD 2 807 includes STA2.1 816.1, STA2.2 816.2, and STA2.3 816.3 that operate in accordance with link 1 802.1, link 2 802.2, and link 3 802.3, respectively. In some embodiments non-AP MLD 1 806 and non-AP MLD 2 807 operate in accordance with a mesh network. Using three links enables the non-AP MLD 1 806 and non-AP MLD 2 807 to operate using a greater bandwidth and to operate more reliably as they can switch to using a different link if there is interference or if one link is superior due to operating conditions.

The distribution system (DS) 810 indicates how communications are distributed and the DS medium (DSM) 812 indicates the medium that is used for the DS 810, which in this case is the wireless spectrum.

AP MLD 808 includes AP1 830, AP2 832, and AP3 834 operating on link 1 802.1, link 2 802.2, and link 3 802.3, respectively. AP MLD 808 includes a MAC address that may be used by applications to transmit and receive data across one or more of AP1 830, AP2 832, and AP3 834.

AP1 830, AP2 832, and AP3 834 include a frequency band, which are other band 836, control (CNTRL) band 838, and managed band 840, respectively. The links 802.1, 802.2, and 802.3 are frequency bands such as 2.4 GHz band, 5 GHz band, 6 GHz band, 7 GHz band, 1-10 GHz, a private network band (such as a licensed band acquired locally by an enterprise for use with Wi-Fi operation), and so forth. The CNTRL band 838 is an unregulated band as described below. The bands 836, 838, and 840 may be other bands, in accordance with some embodiments.

AP1 830, AP2 832, and AP3 834 may operate different BSSIDs, which are BSSID 842, BSSID 844, and BSSID 846, respectively. AP1 830, AP2 832, and AP3 834 include different media access control (MAC) address (addr), which are MAC adder 848, MAC addr 850, and MAC addr 852, respectively. The AP 502 is an AP MLD 808, in accordance with some embodiments. The STA 504 is a non-AP MLD 3 809, in accordance with some embodiments.

The non-AP MLD 3 809 includes non-AP STA1 818, non-AP STA2 820, and non-AP STA3 822. Each of the non-AP STAs have a MAC address (not illustrated) and the non-AP MLD 3 809 has a MAC address 855 that is different and used by application programs where the data traffic is split up among non-AP STA1 818, non-AP STA2 820, and non-AP STA3 822.

The STA 504 is a non-AP STA1 818, non-AP STA2 820, or non-AP STA3 822, in accordance with some embodiments. The non-AP STA1 818, non-AP STA2 820, and non-AP STA3 822 may operate as if they are associated with a BSS of AP1 830, AP2 832, or AP3 834, respectively, over link 1 804.1, link 2 804.2, and link 3 804.3, respectively.

A Multi-link device such as non-AP MLD 1 806 or non-AP MLD 2 807, is a logical entity that contains one or more STAs 814, 816. The non-AP MLD 1 806 and non-AP MLD 2 807 each has one MAC data service interface and primitives to the logical link control (LLC) and a single address associated with the interface, which can be used to communicate on the DSM 812. Multi-link logical entity allows STAs 814, 816 within the multi-link logical entity to have the same MAC address, in accordance with some embodiments. In some embodiments a same MAC address is used for application layers and a different MAC address is used per link 802.

In an infrastructure framework, AP MLD 808, includes APs 830, 838, 840, on one side, and non-AP MLD 3 809 includes non-APs STAs 818, 820, 822 on the other side. AP MLD 808 is a ML logical entity, where each STA within the multi-link logical entity is an AP 502, in accordance with some embodiments. Non-AP MLD 1 806, non-AP MLD 2 807, non-AP MLD 809 are multi-link logical entities, where each STA within the multi-link logical entity is a non-AP STA 504. AP1 830, AP2 832, and AP3 834 may be operating on different bands and there may be fewer or more APs. STA1.1 814.1, STA1.2 814.2, and STA1.3 814.3 may be operating on different bands and there may be fewer or more STAs as part of the non-AP MLD 3 809.

In some embodiments, a multi-link device (MLD), 806 or 807, is a device that is a logical entity and has more than one affiliated station (STA), e.g., STAs 814, and has a single medium access control (MAC) service access point (SAP) to logical link control (LLC), which includes one MAC data service.

Each of the links has a link identification (LinkID) that may be used to identify the link 802. In some embodiments, the AP MLD 808, non-AP MLD 3 809, non-AP MLD 1 806, and/or non-AP MLD 2 807 maintain a TID to LinkID 870, SCSID to LinkID 876, and/or a TID to LINKID and SCSID 882. The AP MLD 808 may select the link 802 to transmit a frame, MSDU, or PPDU based on the TID 872 associated with the MSDU in accordance with the TID to LinkID 870 table. The AP MLD 808 may select the link 802 to transmit a frame, MSDU, or PPDU based on the SCSID 878 associated with the MSDU in accordance with the SCSID to LinkID 876 table. The AP MLD 808 may select the link 802 to transmit a frame, MSDU, or PPDU based on the TID 872 and SCSID 888 associated with the MSDU in accordance with the TID to LinkID and SCSID 882 table.

In some embodiments, there is a mode 890, which when sets enforces one or more of the TID to linkID 870 table, the SCSID to linkID 876 table, and/or the TID to linkID and SCSID 882 table on the non-AP MLD 3 809. For example, the non-AP MLD 3 809 would have to send traffic with SCSID 888 and TID 884 on the link 802 corresponding to linkID 886.

There is becoming more and more devices which require specific latency-sensitive traffic to send. This is traffic which needs to be successfully transmitted within a particular service period (with a specific delay bound). As a step to better handle these cases, IEEE 802.11be (IEEE P802.11be™/D2.1, July 2022), which is hereby included by reference in its entirety, defines a restricted target wake time (TWT) for this purpose. This is the same as a TWT agreement, except that there are specific rules to follow for all STAs in the BSS supporting the rTWT to follow, such as to stop an ongoing TxOP at the beginning of the rTWT Service Period (SP), in order to force a contention period at the start of the TWT SP. There are also ways to define the type of traffic that will be transmitted by the AP or the STA during the service period (definitions for DL and for UL as to which TIDs are going to be prioritized.

The SCS procedure may work at the MLD level and may include a QoS Characteristics element in order to describe the traffic, in accordance with some embodiments. QoS requirements, delay bound, time of arrival of burst may be included in the QoS characteristics element. In some embodiments, traffic is given a specific SCSID identifier.

For some applications like Virtual Reality (VR), there are multiple types of traffic. For example, a first type of traffic carries the image to render in downlink (DL) to the headset, which is usually a large transfer requiring a high throughput, in addition to typically having a new image transmitted with a specific periodicity. And a second type of traffic to carry the motion update in the uplink (UL) from the headset (if the user moved their head, and to trigger an update of the rendered image). The second type of traffic is a low throughput but highly time sensitive with a very strict delay bound.

Some embodiments, handle such applications with Multi-Link operation having the high throughout DL traffic be carried on a link at 6 GHz (for instance). Further, the low throughput UL traffic is carried on a link with a much smaller bandwidth (BW) but with a much better insurance of meeting QoS characteristics, for instance on a private network band (licensed band acquired locally by an enterprise for use with Wi-Fi operation). There is a need for mapping the traffic on the different bands/links at the MLD level, but with a finer granularity than with TID-to-link mapping function.

Multiple SCSIDs can be mapped to the same TID (which would typically be the case for the VR application previously mentioned). In some embodiments, only one traffic (UL) on one of the link (private network), while the other traffic (DL) will be mapped to the other link (6 GHz). The private network band may have more restrictions where only some traffic is allowed and where channel access may be more regulated by the AP than for IEEE 802.11. In some embodiments, an AP can make sure that for a specific TID, only one or some SCSIDs are allowed but not all traffic belonging to this TID.

In some embodiments, a method is disclosed between an AP MLD and an associated non-AP MLD, or between 2 MLD peers, to map traffic with a particular SCSID to one or more links.

In some embodiments, a QoS characteristics element is included in an SCS Request/Response frame to characterize the traffic and give it a specific SCSID which describes the link mapping for the SCSID in a linkID field. In some embodiments, a QoS characteristics element, which is included in an SCS Request/Response frame characterizes the traffic and gives it a specific SCSID which describes the link mapping for the SCSID. In other embodiments, traffic is limited to LinkID based on the TID and the SCSIDs.

In some embodiments, apparatuses, computer readable media, and methods are disclosed, between an AP MLD and an associated non-AP MLD, or between 2 MLD peers, to map traffic with a particular SCSID to one or more links, and to be able to do that for multiple SCSIDs.

In some embodiments, the QoS characteristics element, which is included in an SCS Request/Response frame to characterize the traffic and give it a specific SCSID, is used. A linkID field of the QoS characteristic element identifies the linkID and the SCSID is identified by the request/response frame. If the traffic is in DL or is in UL, the link ID field will indicate on which link the traffic will be mapped to upon successful SCS negotiation.

In some embodiments, mapping a specific SCSID to multiple links, requires a field. In some embodiments, the field may be referred to as a LinkID Bitmap field, with one bit corresponding to each of the setup links where a value of 1 indicates that the traffic is mapped to the corresponding link and 0 indicates the traffic is not mapped to the correspond link.

In some embodiments, a TID-to-link mapping function is disclosed to make sure that the TID, which may also be mapped to a SCSID, are mapped to the desired link for the SCSID. And in these embodiments, all traffic belonging to that TID, in addition to the SCSID, could also be mapped to that link.

In some embodiments, if a change in the mapping is desired, the SCS negotiation would have to be done again. In some embodiments, a SCSID to link mapping is used, with a specific element in a dedicated SCSID-to-link mapping request and response frame. This enables negotiations of the mapping of one or more SCSIDs to one or more links.

For instance, the SCSID-to-link mapping request could include an element with an SCSID field describing the SCSID (or possibly a list of SCSIDs), and a linkID bitmap field indicating the links to which the SCSID/SCSID-list is/are mapped to. This negotiation can be initiated by any peer (AP MLD or non-AP MLD), in accordance with some embodiments. In some embodiments, the method defines a mode, like for TID-to-link mapping, where the AP MLD would have the power to enforce its mapping on the non-AP MLD (a mandatory mode).

In some embodiments, SCSIDs that are allowed on a link are restricted to where the corresponding TID is mapped to where the corresponding TID is carried in the QoS characteristics element of the SCSID.

For example, with three SCSIDs, SCSID 1, 2, 3 which are mapped to TID7, and a mapping of TID 7 mapped to link 1 with no restrictions, TID 7 mapped to link 2 with only SCSID 1, and TID 7 mapped to link 3 with only SCSID2 and 3.

In some embodiments, a frame or an element is used which includes SCSID-to-link mapping frame or a TID-to-link mapping frame in order to specify for a specific link and a specific TID if there are further restrictions like a list of SCSIDs that are the only ones that are allowed for this TID on this link. The element or frame includes a Link ID field or Link ID bitmap field, a TID field, and a list of SCSIDs.

If the SCSID-to-link mapping is agreed, that means that on the link indicated in LinkID field, if the TID indicated in the TID field is mapped to the link, then within that TID, only frames belonging to the SCSIDs listed in the element are allowed. Other SCSIDs for the same TID will not be allowed on that link.

Figure 9:
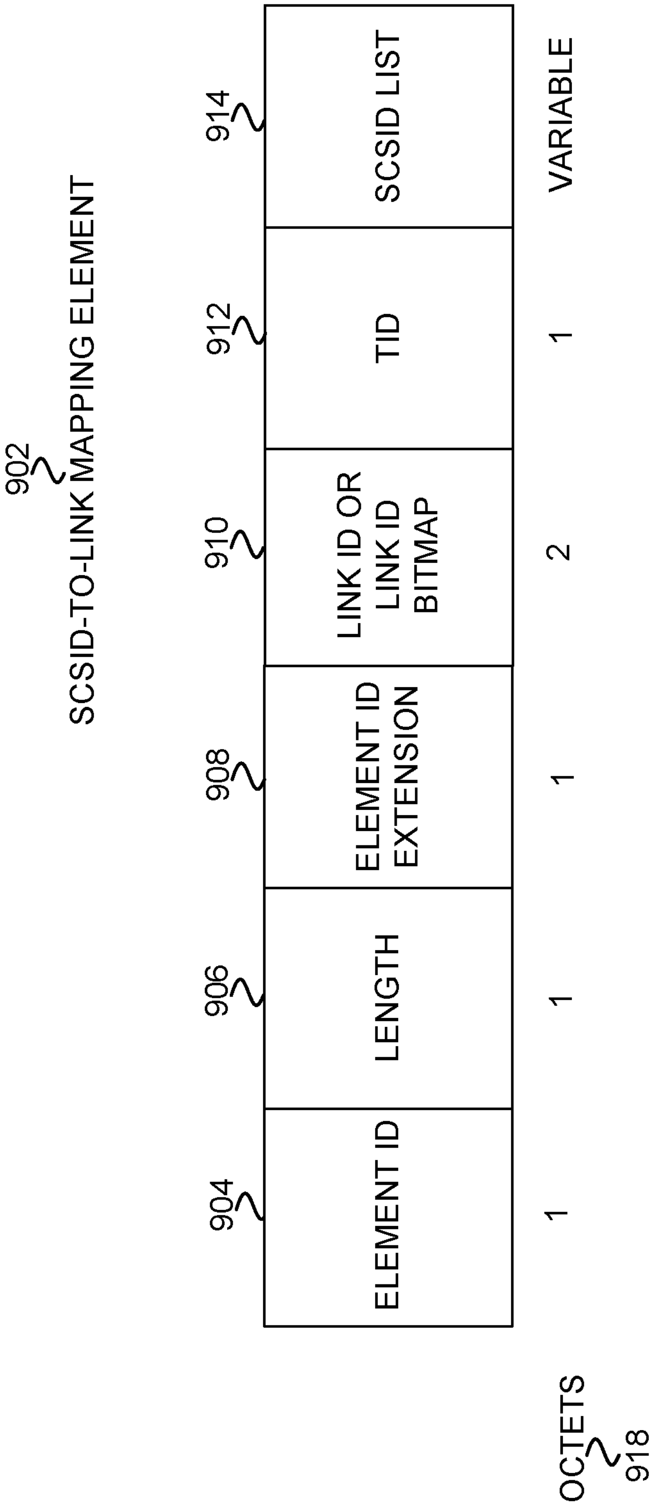
FIG. 9 illustrates a SCSID-to-Link mapping element, in accordance with some embodiments.

FIG. 9 illustrates a SCSID-to-Link mapping element 902, in accordance with some embodiments. The SCSID-to-Link mapping element 902 includes an element ID 904 subfield, length 906 subfield, element ID extension 908 subfield, a link ID or Link ID bitmap 910 subfield, a TID 912 subfield, and a SCSID list 914 subfield. The SCSID-to-Link mapping element 902 may be a frame or dedicated subfield, in accordance with some embodiments. The link ID or Link ID bitmap 910 subfield indicates one or more linkIDs corresponding to links 802 (FIG. 8). The TID 912 subfield indicates a TID. The SCSID list 914 subfield is disclosed in conjunction with FIG. 10. The number of octets 918 is indicated below the subfield.

Figure 10:
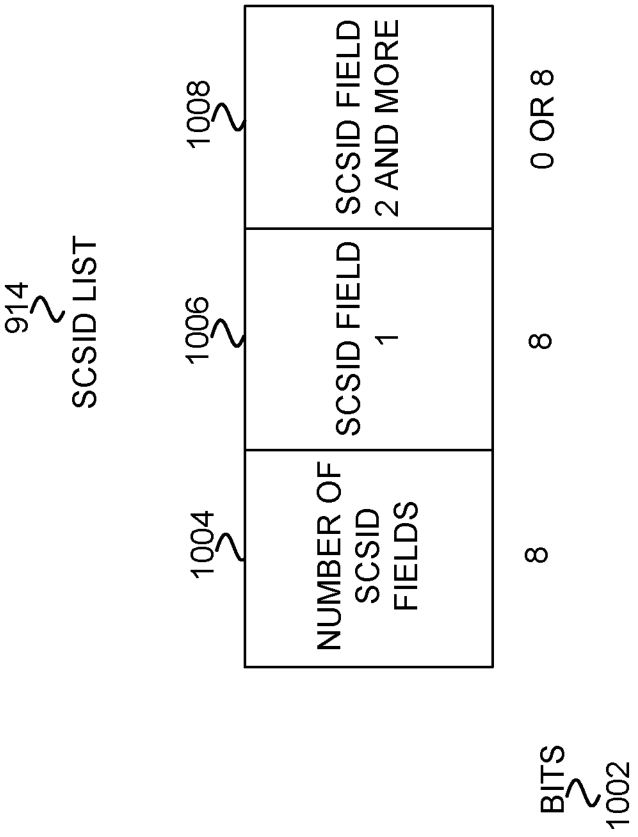
FIG. 10 illustrates a SCSID list subfield, in accordance with some embodiments.

FIG. 10 illustrates a SCSID list 914 subfield, in accordance with some embodiments. The number of SCSID fields 1004 subfield indicates a number of SCSID fields. The SCSID field 1 1006 subfield indicates a SCSID. The SCSID field 2 and more 1008 subfield indicates zero or more subfields that each indicate a SCSID. The SCSID-to-Link mapping element 902 is used to generate the SCSID to linkID 876 table or mapping of FIG. 8. The number of bits 1002 is indicated below the subfield.

Figure 11:
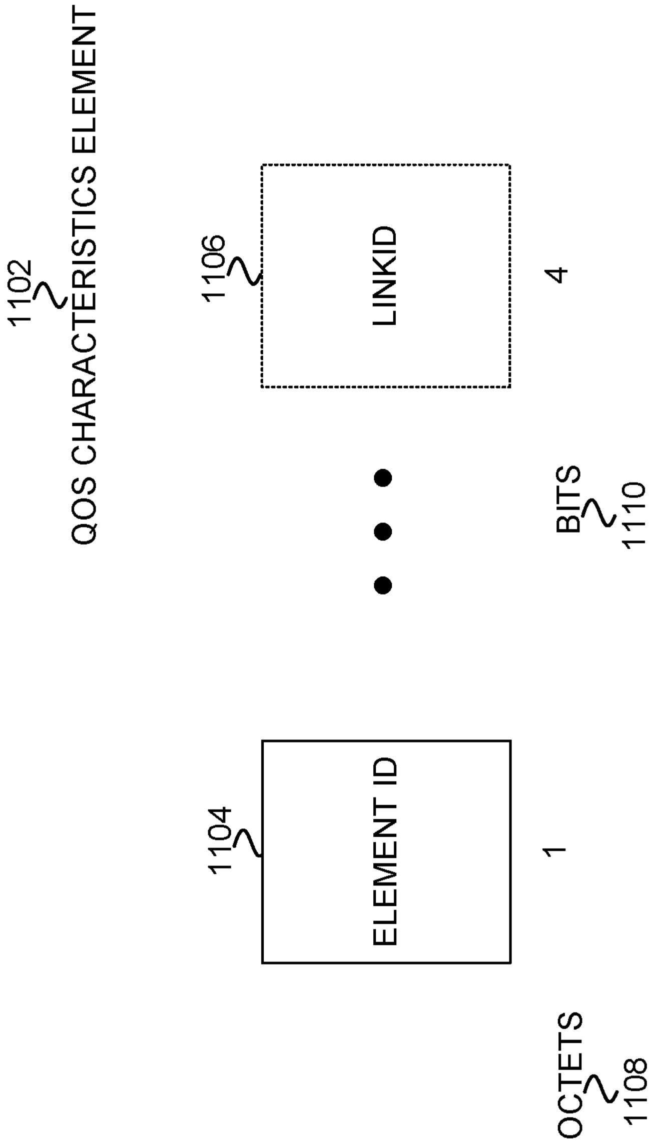
FIG. 11 illustrates a QOS characteristics element, in accordance with some embodiments.

FIG. 11 illustrates a QOS characteristics element 1102, in accordance with some embodiments. The element ID 1104 is an element ID. The linkID 1106 subfield indicates a linkID. The number of octets 1108 and the number of bits 1110 is indicated below the subfields. The QoS characteristic element 1102 may be included with a SCS request/response frame and may indicate a request or confirmation that the SCSID 878 is mapped to the LinkID. The linkID info 880 of FIG. 8 may be the QoS characteristic element 1102, in accordance with some embodiments.

Figure 12:
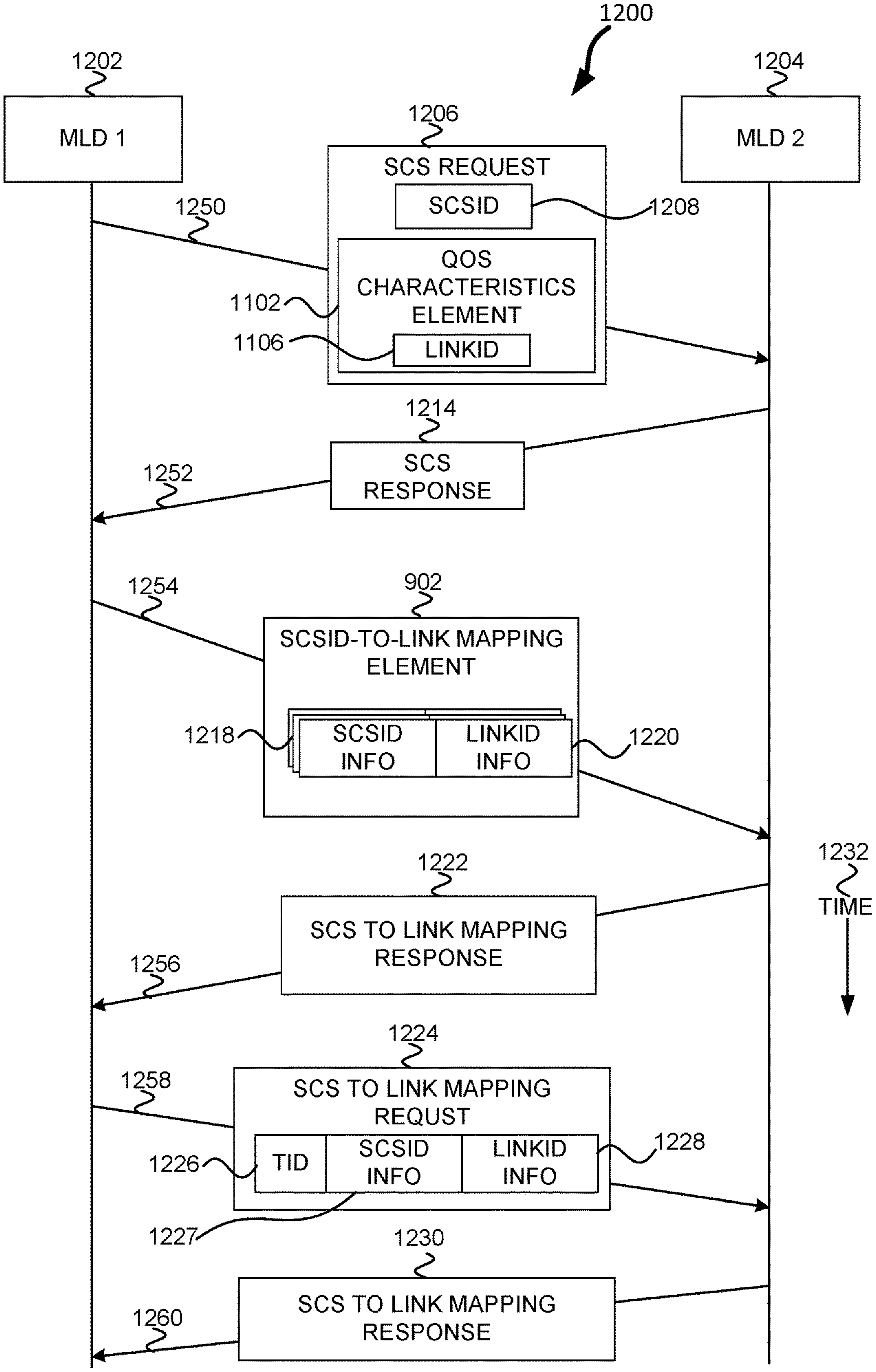
FIG. 12 illustrates a method for SCS ID MAPPINGS TO MLD LINKS, in accordance with some embodiments.

FIG. 12 illustrates a method 1200 for SCS ID MAPPINGS TO MLD LINKS, in accordance with some embodiments. Time 1232 progresses from the top to the bottom. MLD 1 1202 and MLD 2 1204 are MLD as disclosed herein. The method 1200 begins at operation 1250 with the MLD 1 1202, which may be a non-AP STA of an MLD such as non-AP STA1 818, transmitting a SCS request 1206 frame. The SCS request 1206 frame including a QOS characteristic element 1102, which include a linkID 1106 subfield. The MLD 2 1204, which may be an AP of an MLD such as AP1 830, decodes the SCS request 1206. If the requested mapping is granted, then SCSID to linkID 876 table is updated to include the mapping between the SCSID 1208 and the linkID 1106.

The method 1200 continues at operation 1252 with the MLD 2 1204 transmitting a SCS response 1214, which indicates whether the SCSID 1208 to LinkID 1106 mapping is accepted. If the mapping is accepted, then MLD 2 1204 will map traffic with the SCSID 1208 to the link corresponding to the LinkID 1106. Additionally, in some embodiments, if the mode 890 is set to on (or another value), then the MLD 1 1202 is required to use the link corresponding to the LinkID indicated by the LinkID 1106 subfield for traffic that is part of the SCSID indicated by the SCSID 1208 subfield.

The method 1200 continues at operation 1254 with the MLD 1 1202 transmitting a SCSID-to-link mapping element 902, which includes a SCSID information (info) 1218 subfield and a linkID information 1220 subfield. The SCSID info 1218 subfield may be the same or similar as SCSID list 914 subfield. The linkID information 1220 subfield may be the same or similar as the link ID or link ID bitmap 910 subfield. Operation 1254 is requesting that the SCSIDs indicated in the SCSID information 1218 subfield be mapped to the linkIDs indicated in the linkID information 1220 subfields in, for example, the SCSID to linkID 876 table.

The method 1200 continues at operation 1256 with the MLD 2 1204 transmitting a SCS to link mapping response 1222, which indicates whether the SCSIDs to linkIDs indicated in the SCSID to Link mapping element 902 were accepted. If the mapping is accepted, then MLD 2 1204 will map traffic in accordance with the mapping. Additionally, in some embodiments, if the mode 890 is set to on (or another value), then the MLD 1 1202 is required to map traffic in accordance with the mapping indicated in the SCSID to Link mapping element 902 and, in some embodiments, other mappings in accordance with the MLD 2 1204.

The method 1200 continues at operation 1258 with the MLD 1 1202 transmitting the SCS to Link Mapping request 1224 element, which includes a TID 1226 subfield, a SCSID information 1227 subfield, and a linkID information 1228 subfield. The SCS to link mapping request 1224 element may correspond to one or more entries in the TID to LinkID and SCSID 882 table. The SCS to link mapping request 1224 element indicates a request to restrict or permit traffic for a linkID only for a specific TID indicated by the TID 1226 for SCSID indicated by the SCSID information 1227 subfield.

The method 1200 continues at operation 1260 with the MLD 2 1204 transmitting a SCS to link mapping response 1230, which indicates whether the mappings of a TID and SCSIDs to linkIDs indicated in the SCS to Link Mapping request 1224 element were accepted. If the mapping is accepted, then MLD 2 1204 will map traffic in accordance with the mapping and may update the TID to LinkID and SCSID 882 table. Additionally, in some embodiments, if the mode 890 is set to on (or another value), then the MLD 1 1202 is required to map traffic in accordance with the mapping indicated in SCS to Link Mapping request 1224 element and, in some embodiments, other mappings in accordance with the MLD 2 1204.

The method 1200 may be performed by an apparatus of a non-AP or STA or an apparatus of an AP. The method 1200 may be performed by an MLD. The method 1200 may include one or more additional instructions. The method 1200 may be performed in a different order. One or more of the operations of method 1200 may be optional. In some embodiments, there are three separate methods defined by operations 1250 and 1252; 1254 and 1256; and, 1258 and 1260.

Figure 13:
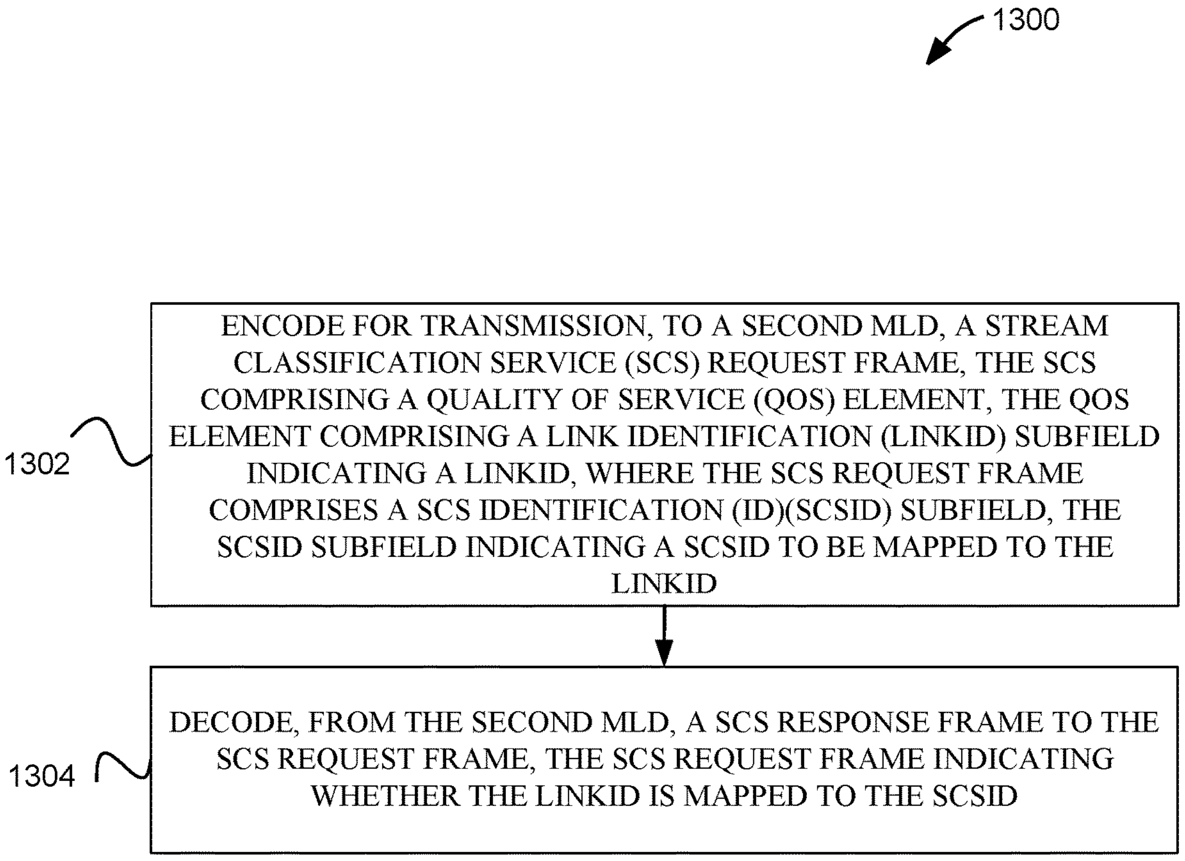
FIG. 13 illustrates a method for SCS ID MAPPINGS TO MLD LINKS, in accordance with some embodiments.

FIG. 13 illustrates a method 1300 for SCS ID MAPPINGS TO MLD LINKS, in accordance with some embodiments. The method 1300 begins at operation 1302 with encoding for transmission, to a second MLD, a stream classification service (SCS) request frame, the SCS comprising a quality of service (QoS) element, the QoS element comprising a link identification (LinkID) subfield indicating a LinkID, wherein the SCS request frame comprises a SCS identification (ID)(SCSID) subfield, the SCSID subfield indicating a SCSID to be mapped to the LinkID. For example, MLD 1 1202 encodes and transmit SCS request 1206 that include QoS characteristics element 1102 with a linked 1106 subfield.

The method 1300 continues at operation 1304 with decode, from the second MLD, a SCS response frame to the SCS request frame, the SCS request frame indicating whether the LinkID is mapped to the SCSID. For example, MLD 2 1204 encodes and transmits a SCS response 1214 which indicates whether the mapping indicated by the SCS request 1206 was granted.

The method 1300 may be performed by an apparatus of a non-AP STA or an apparatus of an AP. The method 1300 may be performed by a non-AP STA of a MLD or AP of an MLD. The method 1300 may include one or more additional instructions. The method 1300 may be performed in a different order. One or more of the operations of method 1300 may be optional.

Figure 14:
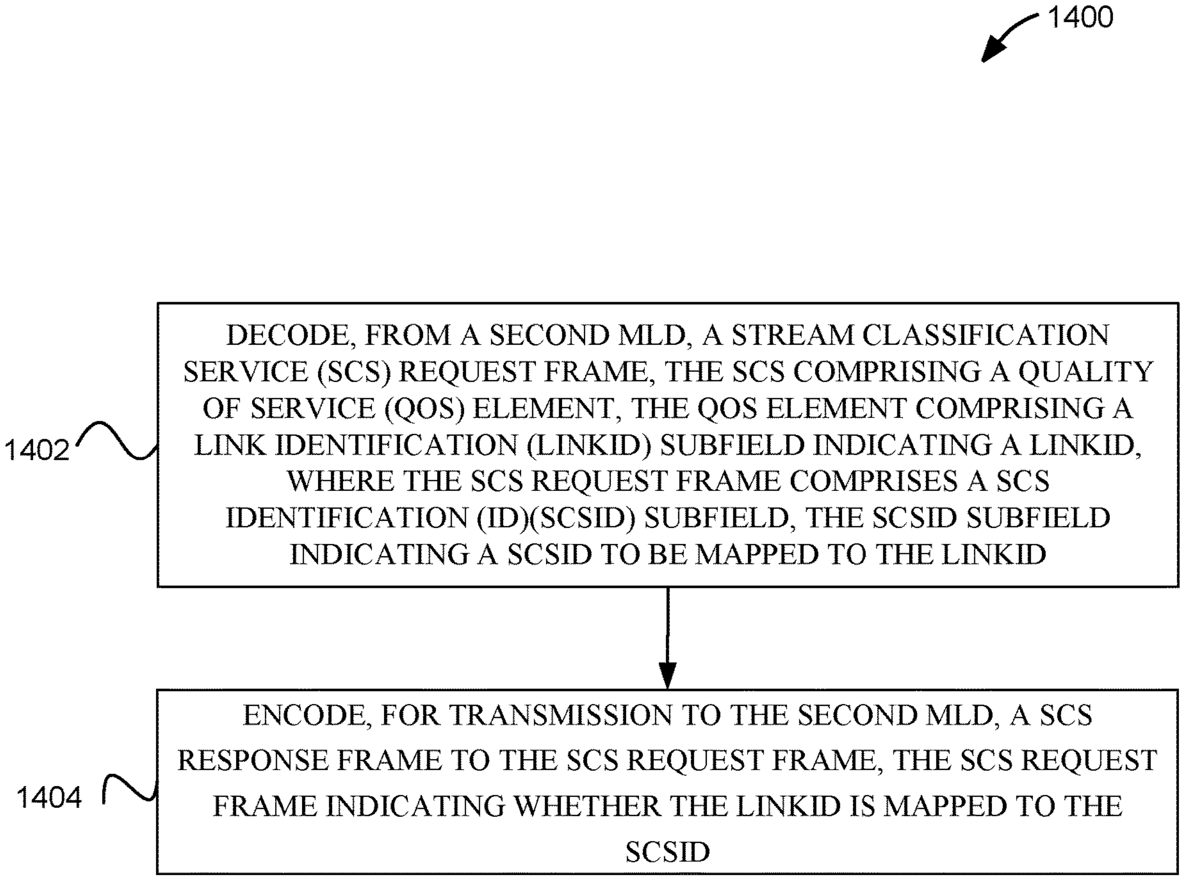
FIG. 14 illustrates a method for SCS ID MAPPINGS TO MLD LINKS, in accordance with some embodiments.

FIG. 14 illustrates a method 1400 for SCS ID MAPPINGS TO MLD LINKS, in accordance with some embodiments. The method 1400 begins at operation 1402 with decoding, from a second MLD, a stream classification service (SCS) request frame, the SCS comprising a quality of service (QoS) element, the QoS element comprising a link identification (LinkID) subfield indicating a LinkID, wherein the SCS request frame comprises a SCS identification (ID)(SCSID) subfield, the SCSID subfield indicating a SCSID to be mapped to the LinkID. For example, MLD 2 1204 decodes SCS request 1206 that includes SCSID 1208 and LinkID 1106.

The method 1400 continues at operation 1404 with encoding, for transmission to the second MLD, a SCS response frame to the SCS request frame, the SCS request frame indicating whether the LinkID is mapped to the SCSID. For example, MLD 2 1204 encodes and transmits SCS response 1214 which indicates whether or not the mapping between the SCSID 1208 and the LinkID 1106 was granted or accepted.

The method 1400 may be performed by an apparatus of a non-AP STA or an apparatus of an AP. The method 1400 may be performed by a non-AP STA of a MLD or AP of an MLD. The method 1400 may include one or more additional instructions. The method 1400 may be performed in a different order. One or more of the operations of method 1400 may be optional.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a non-access point (AP) station (STA) of a first multi-link device (MLD), the apparatus comprising memory; and processing circuitry coupled to the memory, the processing circuitry configured to:

encode for transmission, to a second MLD, a stream classification service (SCS) request frame, the SCS request frame comprising a quality of service (QoS) characteristics element, the QoS characteristics element comprising a link identification (LinkID) subfield indicating a LinkID, wherein the SCS request frame comprises a SCS identification (ID)(SCSID) subfield, the SCSID subfield indicating a SCSID to be mapped to the LinkID, and the SCS request frame identifying a classified traffic stream by the SCSID; and decode, from the second MLD, a SCS response frame to the SCS request frame, the SCS request frame indicating whether the LinkID is mapped to the SCSID.

2. The apparatus of claim 1 wherein the second MLD further comprises: an AP of the second MLD or a non-AP of the second MLD.

3. The apparatus of claim 1 wherein the SCSID subfield is a first SCSID subfield and the SCSID is a first SCSID, and wherein the processing circuitry is further configured to:

encode for transmission, to the second MLD, a SCS link mapping request, the SCS link mapping request comprising a second SCSID subfield and a LinkID information subfield, wherein the second SCSID subfield indicates a second SCSID, and wherein the LinkID information subfield indicates LinkIDs to be mapped to the SCSID.

4. The apparatus of claim 3 wherein the LinkID information subfield is a bitmap indicating which LinkIDs of the second MLD are to be mapped to the second SCSID.

5. The apparatus of claim 3 wherein the processing circuitry is further configured to:

decode, from the second MLD, a frame, the frame comprising an indication of whether the LinkIDs are mapped to the SCSID.

6. The apparatus of claim 1 wherein the processing circuitry is further configured to:

encode for transmission, to the second MLD, a SCS-to-link mapping request element, the SCS-to-link mapping request element comprising a traffic identification (TID) subfield, a SCSID information subfield, and a linkID information subfield, the TID subfield indicating a TID, the SCSID information subfield indicating at least one SCSID, the linkID information subfield indicating at least one linkID of a link of the second MLD, wherein the SCS-to-link mapping request element indicates that the at least one SCSID is to be an only SCSID permitted to use the at least one linkID for frames comprising the TID.

7. The apparatus of claim 6 wherein the LinkID information subfield is a bitmap indicating which LinkIDs of the second MLD comprise the at least one LinkID.

8. The apparatus of claim 6 wherein the SCSID information subfield comprises a number of SCSIDs subfield, the number of SCSIDs subfield indicating a number of SCSIDs included in the SCSID information subfield, and wherein the SCSID information subfield further comprises the number of SCSIDs subfields.

9. The apparatus of claim 6 wherein the processing circuitry is further configured to:

decode a response to the SCS-to-link mapping request element, the response indicating that the at least one SCSID is to be the only SCSID permitted to be used on the at least one linkID for the TID.

10. The apparatus of claim 1 wherein the processing circuitry is further configured to:

encode for transmission, to the second MLD, a SCS-to-link mapping request element, the SCS-to-link mapping request element comprising a traffic identification (TID) subfield, a SCSID information subfield, and a linkID information subfield, the TID subfield indicating a TID, the SCSID information subfield indicating at least one SCSID, the linkID information subfield indicating at least one linkID of a link of the second MLD, wherein the SCS-to-link mapping request element indicates that the at least one SCSID is not to be permitted to be used for the at least one linkID for frames comprising the TID.

11. The apparatus of claim 1 wherein the processing circuitry is further configured to:

encode for transmission over a link of the second MLD corresponding to the LinkID, a physical layer protocol data unit PPDU, the PPDU comprising a media access control (MAC) Service Data Unit (MSDU), the MSDU comprising an indication of a first user priority matching a second user priority, wherein the SCS request frame comprises the second user priority.

12. The apparatus of claim 1 wherein the processing circuitry is further configured to:

decode a frame comprising a mode, the mode indicating that the non-AP STA of the MLD is to transmit traffic in accordance with a TID to LinkID mapping of the second MLD.

13. The apparatus of claim 1, further comprising transceiver circuitry coupled to the processing circuitry, the transceiver circuitry coupled to two or more patch antennas for receiving signaling in accordance with a multiple-input multiple-output (MIMO) technique.

14. A non-transitory computer-readable storage medium that stores instructions for execution by one or more processors of an apparatus for a non-access point (AP) station (STA) of a first multi-link device (MLD), the instructions to configure the one or more processors to:

encode for transmission, to a second MLD, a stream classification service (SCS) request frame, the SCS comprising a quality of service (QoS) characteristics element, the QoS characteristics element comprising a link identification (LinkID) subfield indicating a LinkID, wherein the SCS request frame comprises a SCS identification (ID)(SCSID) subfield, the SCSID subfield indicating a SCSID to be mapped to the LinkID, and the SCS request frame identifying a classified traffic stream by the SCSID; and decode, from the second MLD, a SCS response frame to the SCS request frame, the SCS request frame indicating whether the LinkID is mapped to the SCSID.

15. The non-transitory computer-readable storage medium of claim 14 wherein the SCSID subfield is a first SCSID subfield and the SCSID is a first SCSID, and wherein the instructions further comprise:

encode for transmission, to the second MLD, a SCS link mapping request, the SCS link mapping request comprising a second SCSID subfield and a LinkID information subfield, wherein the second SCSID subfield indicates a second SCSID, and wherein the LinkID information subfield indicates LinkIDs to be mapped to the SCSID.

16. The non-transitory computer-readable storage medium of claim 14 wherein the instructions further comprise:

encode for transmission, to the second MLD, a SCS-to-link mapping request element, the SCS-to-link mapping request element comprising a traffic identification (TID) subfield, a SCSID information subfield, and a linkID information subfield, the TID subfield indicating a TID, the SCSID information subfield indicating at least one SCSID, the linkID information subfield indicating at least one linkID of a link of the second MLD, wherein the SCS-to-link mapping request element indicates that the at least one SCSID is to be the only SCSID permitted to use the at least one linkID for frames comprising the TID.

17. An apparatus for an access point (AP) of a first multi-link device (MLD), the apparatus comprising memory; and processing circuitry coupled to the memory, the processing circuitry configured to:

encode for transmission, to a second MLD, a stream classification service (SCS) request frame, the SCS comprising a quality of service (QoS) characteristics element, the QoS characteristics element comprising a link identification (LinkID) subfield indicating a LinkID, wherein the SCS request frame comprises a SCS identification (ID)(SCSID) subfield, the SCSID subfield indicating a SCSID to be mapped to the LinkID, and the SCS request frame identifying a classified traffic stream by the SCSID; and encode, for transmission to the second MLD, a SCS response frame to the SCS request frame, the SCS request frame indicating whether the LinkID is mapped to the SCSID.

18. The apparatus of claim 17 wherein the SCSID subfield is a first SCSID subfield and the SCSID is a first SCSID, and wherein the processing circuitry is further configured to:

decode for transmission, to the second MLD, a SCS link mapping request, the SCS link mapping request comprising a second SCSID subfield and a LinkID information subfield, wherein the second SCSID subfield indicates a second SCSID, and wherein the LinkID information subfield indicates LinkIDs to be mapped to the SCSID.

19. The apparatus of claim 17 wherein the processing circuitry is further configured to:

decode, from the second MLD, a SCS-to-link mapping request element, the SCS-to-link mapping request element comprising a traffic identification (TID) subfield, a SCSID information subfield, and a linkID information subfield, the TID subfield indicating a TID, the SCSID information subfield indicating at least one SCSID, the linkID information subfield indicating at least one linkID of a link of the second MLD, wherein the SCS-to-link mapping request element indicates that the at least one SCSID is to be a only SCSID permitted to use the at least one linkID for frames comprising the TID.

20. The apparatus of claim 17 wherein the processing circuitry is further configured to:

select a link of the first MLD based on an indication of a first user priority matching a second user priority, wherein the SCS request frame comprises the second user priority and a media access control (MAC) Service Data Unit (MSDU) comprises the first user priority; and encode for transmission over the selected link a physical layer protocol data unit PPDU, the PPDU comprising the MSDU.

* * * * *